US005745760A

United States Patent [19]

Kawamura et al.

[11] Patent Number: 5,745,760

[45] Date of Patent: Apr. 28, 1998

[54] APPARATUS FOR STORING UP SOCKET COMMUNICATION LOG

[75] Inventors: Kazuhiko Kawamura; Takashi Tsuboi, both of Kanagawa, Japan

[73] Assignee: Sony Corporation, Japan

[21] Appl. No.: 932,680

[22] Filed: Aug. 20, 1992

[30] Foreign Application Priority Data

Aug. 30, 1991 [JP] Japan .................................... 3-220731

[51] Int. Cl.$^6$ .................................... G06F 9/00

[52] U.S. Cl. .................................... 395/680

[58] Field of Search .................................... 364/550, 514, 364/920.6; 340/825.15; 358/84; 395/600, 650, 680, 200.57; 348/1

[56] References Cited

U.S. PATENT DOCUMENTS

| | | | |
|---|---|---|---|
| 4,547,804 | 10/1985 | Greenberg | 358/84 X |
| 4,797,663 | 1/1989 | Rios | 364/550 X |
| 4,887,204 | 12/1989 | Johnson et al. | 364/200 |
| 4,931,871 | 6/1990 | Kramer | 358/84 X |
| 5,023,832 | 6/1991 | Fulcher, Jr. et al. | 395/600 |
| 5,038,345 | 8/1991 | Roth | 340/825.15 X |
| 5,047,962 | 9/1991 | Cornish | 364/550 |
| 5,060,140 | 10/1991 | Brown et al. | 364/200 |
| 5,065,321 | 11/1991 | Bezos et al. | 364/550 X |
| 5,133,053 | 7/1992 | Johnson et al. | 395/200 |
| 5,155,693 | 10/1992 | Altmayer et al. | 364/550 |
| 5,267,351 | 11/1993 | Reber et al. | 395/600 |

OTHER PUBLICATIONS

"Sun UNIX System Release 4.1" Having the Following Command sections: The User Command Date (Last Change 23 Nov. 1987) pp. 1–3, The User Command Man (Last Change 12 Jan. 1988) pp. 1–4, The Maintenance Command Netstat (Last Change 6 Jan. 1989) pp. 1–4, and The System Call Socket (Last Change 21 Jan. 1990) pp. 1–4.

King et al., "Interprocess Communication in the UNIX 4.2BSD Environment", Distributed Computing Research Laboratory, May 1986.

Interprocess Communication: Sockets, pp. 175–196.

Alfred Spector, "Performing Remote Operations Efficiently on a Local Computer Network", Association for Computing Machinery, Inc., Apr. 1982, pp. 246–260.

Hwang et al., "A Unix-Based Local Computer Network with Load Balancing", IEEE Computer, vol. 15 No. 4, Apr. 1982, pp. 55–65.

Ciapala et al., "Use of Ethernet and TCP/IP Socket Communications Library Routines for Data Acquisition and Control in the LEP RF System", IEEE Particle Accelerator Conf., May 1991, pp. 1490–1492.

*Primary Examiner*—Ellis B. Ramirez
*Assistant Examiner*—Eric B. Stamber
*Attorney, Agent, or Firm*—Ronald P. Kananen

[57] ABSTRACT

An apparatus for storing up a "socket communication log" of communications between processes in a multitask support system includes communication use libraries connected to the processes. Each of the communication use libraries includes a communication use library function for performing socket communications, and a socket communication log storing unit for storing a log of such socket communications. The log contains information identifying the socket-communication thereby facilitating debugging of programs created with the multitask support system.

8 Claims, 8 Drawing Sheets

R ; Store Log Only Upon Receiving
S ; Store Log Only Upon Transmitting
E ; Store Log Upon Both Transmitting and Receiving
· ; Not Store Log Upon Both Transmitting and Receiving

|   | A | B | C | D |
|---|---|---|---|---|
| A | · | R | R | E |
| B | R | · | E | E |
| C | R | E | · | R |
| D | E | E | R | · |

|   | A | B | C | D |
|---|---|---|---|---|
| A | · | R | R | E |
| B | R | · | R | R |
| C | R | E | · | S |
| D | E | R | · | · |

|   | A |
|---|---|
| A | · |
| B | R |
| C | R |
| D | R |

APPARATUS FOR STORING UP SOCKET COMMUNICATION LOG

BACKGROUND OF THE INVENTION

1. Field of the Invention

The present invention relates to an apparatus for storing a "socket communication log." More particularly, the present invention is directed to an apparatus for storing a socket communication log suitable for use in an apparatus such as a cart machine controlled by a relatively large amount of software in which a plurality of cassettes on which commercials are stored. The commercials are sequentially reproduced in accordance with a broadcast program schedule table to thereby broadcast spot commercials. As used herein, a "socket" relates to a communication channel or system call for communication between "processes," for example in a multiprocess program development support system, a "socket communication" relates to any communication between processes.

2. Description of the Prior Art

In apparatuses controlled by a relatively large amount of software, it is important to effectively debug the software in order to shorten the period required for developing products. One conventional technique for effectively debugging apparatuses controlled by a relatively large amount of software is shown in Japanese Patent Laid-Open Publication No. 3-71344. This technique relates to a multiprocess program development support system.

FIG. 1 shows an arrangement of a conventional multiprocess program development supporting system. Referring to FIG. 1, one system is divided into a plurality of processes, e.g., two processes 1 and 2 at every function thereof. The two processes 1 and 2 are combined to constitute a multiprocess program development support system 3 in a multiprocess configuration. The multiprocess program development support system 3 includes a process management program module 5, an inter process communication library 6, and an inter process communication analyzing program module 7.

The process management program module 5 manages the creation, deletion or interruption of the processes 1 and 2, the communication between the processes 1 and 2, and the running states of the processes 1 and 2. The inter process communication library 6 stores a group of library functions in order to communicate between the processes 1 and 2 while controlled by the process management program module 5. The inter process communication analyzing program module 7 monitors communicating states between the processes 1 and 2 in an interactive mode. Since an inter process communication procedure is supported by the library while developing a program, inter process communication can be achieved easily by merely linking the inter process communication library 6 between the processes 1 and 2. Further, it is possible to monitor the state of the inter process communication in an interactive mode by using the inter process communication analyzing program module 7. This facilitates debugging of software.

However, the multiprocess program development support system 3 merely monitors the state of the inter process communication, but does not log or store the communication states. In order to overcome this problem, it has been proposed to include an intermediate process module between the processes in order to log the communication states in a manner such that the communication between the processes is necessarily performed through the intermediate process module. In this way, the communication logs are retrieved or stored in the intermediate process module. Thus, since the communication logs are retrieved by the intermediate process, the processing between the processes is performed in serial. However, when the inter-program communication is performed through the intermediate process module, as the number of processes and the amount of communication increases, the amount of time required for processing in the intermediate process module increases. Thus, the entire processing speed of the system is decreased. Further, if the intermediate process module becomes inoperable, no communication can be performed. Moreover, it is necessary to take into consideration the intermediate process module when programming the respective processes, thus the overall software structures of the system becomes very complicated.

OBJECTS AND SUMMARY OF THE INVENTION

It is an object of the present invention to provide an improved apparatus for storing a socket communication log in which the aforementioned shortcomings and disadvantages encountered with the prior art can be eliminated.

More specifically, it is an object of the present invention to provide an apparatus for storing a socket communication log without substantially degrading the processing speed of the apparatus when compared 3 with the apparatus in which a communication log is not stored.

According to one aspect of the present invention, an apparatus for storing a communication log when a communication is performed between processes includes respective communication use libraries connected to the processes. Each of the communication use libraries include a library function for performing a socket communication, and a socket communication log storing unit for storing the socket communication log, wherein the communication use library stores the socket communication log in the storing unit when a socket communication is performed between the processes.

According to the present invention, since each of the processes is linked in advance to the communication use library and the socket communication log storing unit is connected to the process modules, the socket communication logs can be stored in the socket communication log storing unit through the associated communication use libraries when a socket communication is performed between the processes. Further, since the processes can store the socket communication logs in parallel, the present invention is advantageous in that the communication log can be stored without substantially degrading the processing speed of the apparatus when compared with the apparatus in which the communication log is not stored.

The preceding and other objects, features, and advantages of the present invention will become apparent from the following detailed description of illustrative embodiments thereof when read in conjunction with the accompanying drawings, in which like reference numerals are used to identify the same or similar parts in the several views.

DETAILED DESCRIPTION OF THE PREFERRED EMBODIMENTS

An apparatus for storing a socket communication log according to embodiments of the present invention will be explained with reference to FIGS. 2 to 10, in which like parts are marked with the same references and therefore explanation thereof is omitted.

Figure 1:
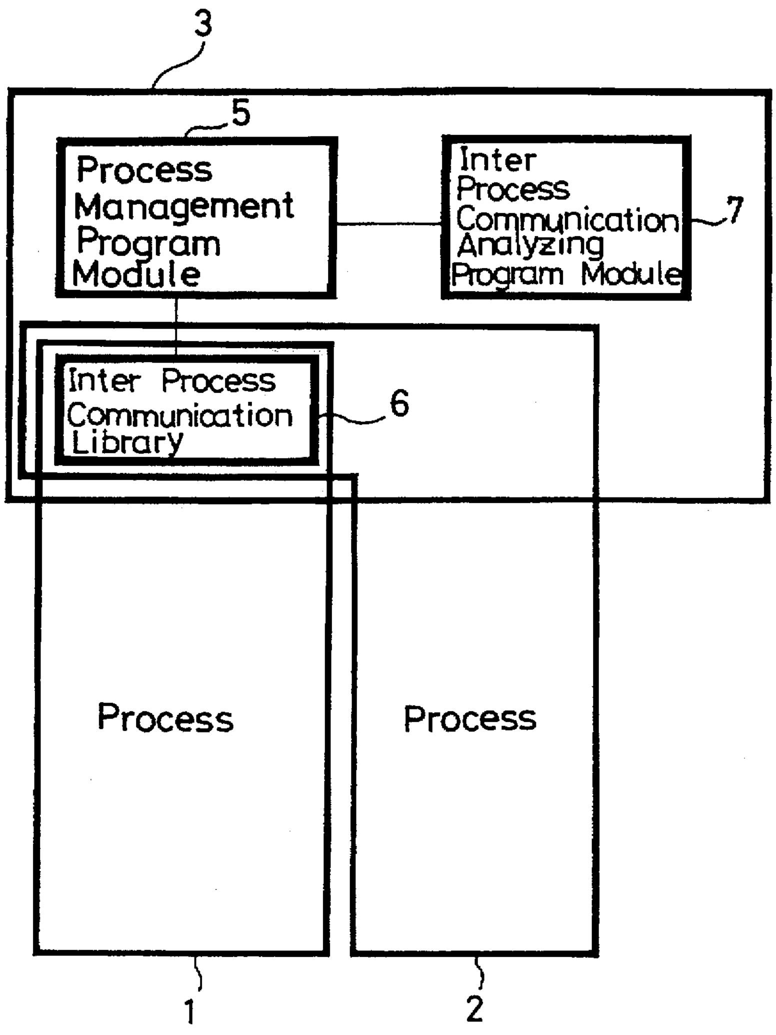
FIG. 1 is a block diagram illustrating a conventional multiprocess program development support system.
Figure 2A:
FIG. 2A is a block diagram illustrating process modules used in a first embodiment of the present invention.

A first embodiment of the present invention is described with reference to FIGS. 2A to 3. FIG. 2A is a block diagram illustrating processes 11 and 12 used in the first embodiment. In this example, each of the "processes" is a task or function as performed independently with multiprocess support system, such as the UNIX system.

Figure 2B:
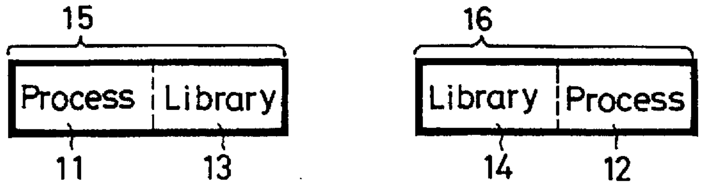
FIG. 2B is a block diagram illustrating process units each having a process module and a communication library linked thereto, used in the first embodiment.
Figure 2C:
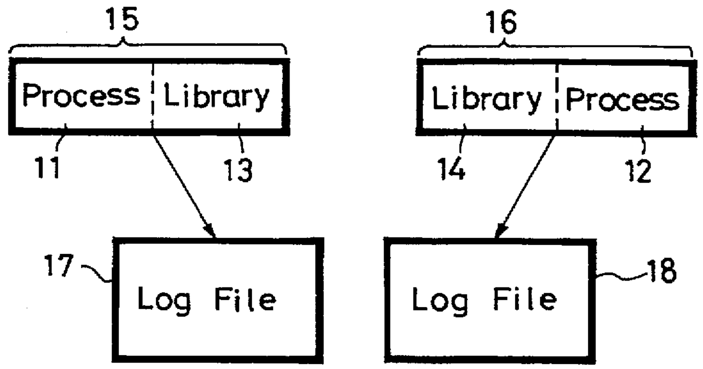
FIG. 2C is a block diagram illustrating the process units, the communication library of each of which is linked to a log file, used in the first embodiment.

Referring to FIG. 2B, the processes 11 and 12 are linked respectively to communication use libraries 13 and 14. In each of the communication use libraries 13 and 14, a communication use library function for performing a socket communication is stored. The communication use libraries 13 and 14 together control and process a communication between the processes 11 and 12. The processes 11 and 12 are linked to the communication use libraries 13 and 14 to form respective process modules 15 and 16. As shown in FIG. 2C, the process modules 15 and 16 can open the log files 17 and 18 which serve as socket communication log storing units. These are accessed by calling initializing processing functions included respectively in the communication use libraries 13 and 14.

Figure 2D:
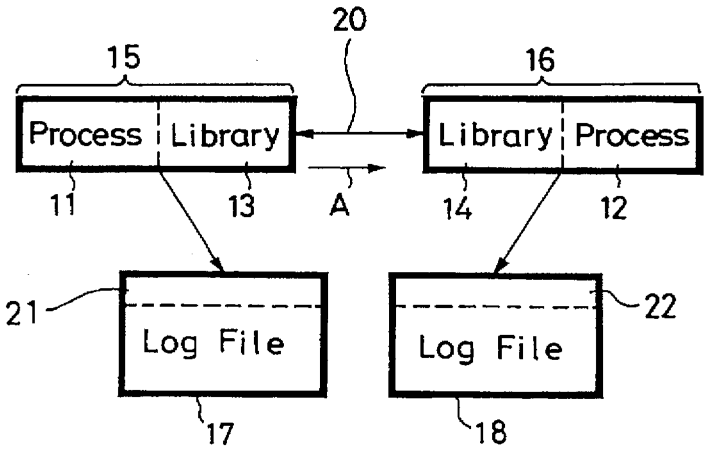
FIG. 2D is a block diagram illustrating an apparatus for storing a socket communication log according to the first embodiment of the present invention.

FIG. 2D is a block diagram illustrating an apparatus for storing a socket communication log (socket communication log storing apparatus) according to the first embodiment. Referring to FIG. 2D, when performing a communication between the process modules 15 and 16, a socket of a stream configuration (hereinafter called a "stream socket") 20 is connected between the process modules 15 and 16. Once the stream socket 20 is connected between the process modules 15 and 16, it is not necessary to take into consideration which one of the process modules 15 and 16 acts as a server process module or as a client process module. In this case, the process modules 15 and 16 perform a communication by using transmitting/receiving functions, such as UNIX functions "1cm_send () and "1cm_recv()" as library functions, rather than UNIX system calls "send ()" and "recv ()". When the socket communication is performed between the process modules 15 and 16 through the stream socket 20, socket communication logs 21 and 22 are recorded in the log files 17 and 18 under the control, respectively, of the communication use libraries 13 and 14.

Figure 3:
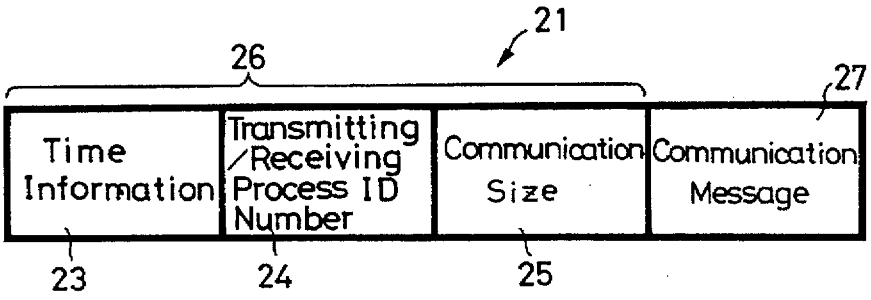
FIG. 3 is a schematic diagram illustrating a construction of a socket communication log used in the first embodiment.

FIG. 3 is a schematic diagram illustrating an example of a construction of the socket communication log 21. The construction of the socket communication log 22 is same as that of the log 21. Referring to FIG. 3, the socket communication log 21 includes a header 26 and a communication message 27 having data. The header 26 has time information 23. This time information includes, for example, a time stamp representing the day and time when UNIX transmitting/receiving functions "1cm_send ()" and "1cm recv()" are called. The header also includes transmitting/receiving process identifier (ID) numbers, that is, source and destination ID numbers 24, and a communication size 25. The concrete contents of the socket communication log 21 such as the communication message 27 is explained below.

By utilizing a socket communication log 21 having time information 23 or the like, after storing the socket communication logs 21 and 22 in respective log files 17 and 18, debugging of the software can be performed in time order or communication order. Therefore, the debugging procedure can be performed efficiently with a decrease in the required for debugging. The communication use libraries 13 and 14 are linked to the process modules 15 and 16, respectively, so that the socket communication logs 21 and 22 can be fetched in parallel. Thus, the processing speed of the apparatus is not degraded substantially when compared with the apparatus in which the communication logs 21, 22 are not fetched or stored. Further, since the process modules 15 and 16 are linked respectively to the communication use libraries 13 and 14, even if one of the process modules (e.g., process module 15) becomes inoperable, the communication can be continued between other process modules to which the stream socket 20 is connected from the module 15.

Moreover, since there is no intermediate process module of the conventional system, the process modules 15 and 16 can be programmed without taking into consideration an intermediate process module. Further, the conventional complicated procedures for connecting the socket between the processes can be simplified due to the provision of the communication use libraries 13 and 14, so that the constructions of the software can be relatively simplified.

Figure 4:
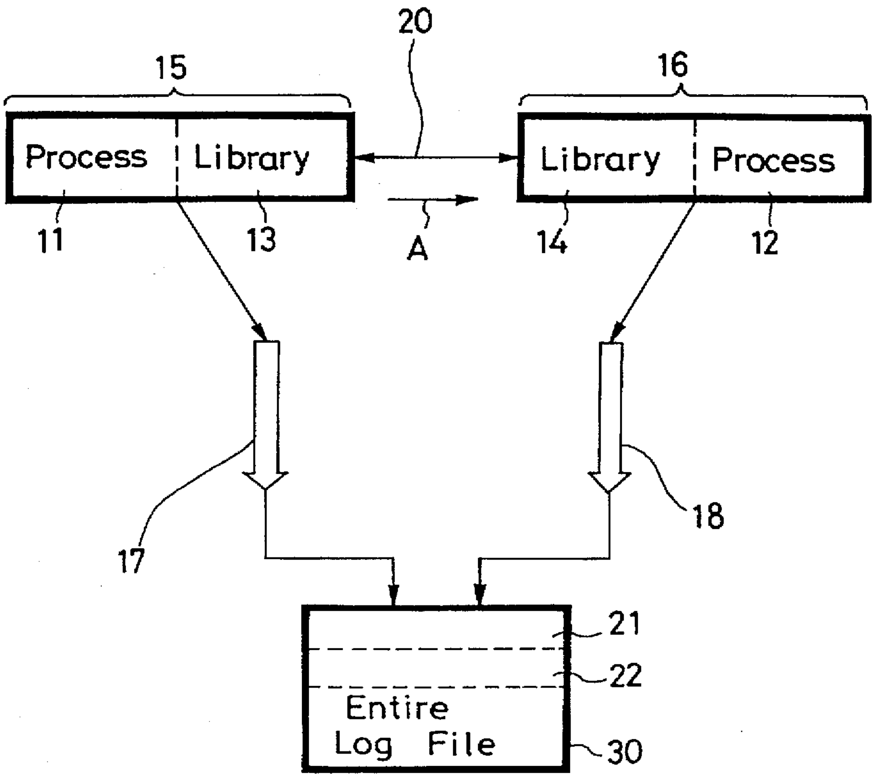
FIG. 4 is a block diagram illustrating an apparatus for storing a socket communication log according to a second embodiment of the present invention.

FIG. 4 is a block diagram illustrating an apparatus for storing of a socket communication log according to a second embodiment of the present invention. In the first embodiment shown in FIG. 2D, the socket communication logs 21 and 22 are stored in the different respective log files 17 and 18, while in the second embodiment shown in FIG. 4, the log files 17 and 18 are connected to a single log file 30 serving as an entire socket communication log storage through symbolic links. Thus, in the second embodiment, the socket communication logs 21 and 22 of the process modules 15 and 16 can be stored in the single log file 30 by order of communication. In the socket communication log storing apparatus of the second embodiment, since the reading processing of the socket communication log 21 can be performed simply, a time period required for debugging the software can be shortened.

The socket communication log storing apparatus shown in FIG. 4 may be modified such that the log files 17 and 18 are deleted and the communication use libraries 13 and 14 are directly connected to the single log file 30.

In the arrangement of each of the embodiments shown in FIGS. 2D and 4, the socket communication logs 21 and 22 of the same contents are stored in the log file(s) in transmission and receiving modes. This is because the apparatus is arranged so that, even if one (receiving or destination side) of the process modules 15 and 16 connected mutually by the stream socket 20 is looped and does not receive the communication data, the other process module (transmission or source side) can store the log. Thus, the apparatus may be arranged such that, when each process module operates normally, the socket communication log of one of the process modules, that is, transmission side or receiving side process module is stored when the socket communication is performed between the process modules.

To this end, a matrix table serving as a reference table (hereinafter called a mask table) may be provided which defines, at every pair of process modules, one (transmission or receiving side) of the process modules by which socket communication log is to be stored. In this case, when performing the socket communication between the process modules, the socket communication log of one of the process modules may be selectively stored by referring to the mask table.

Figure 5A:
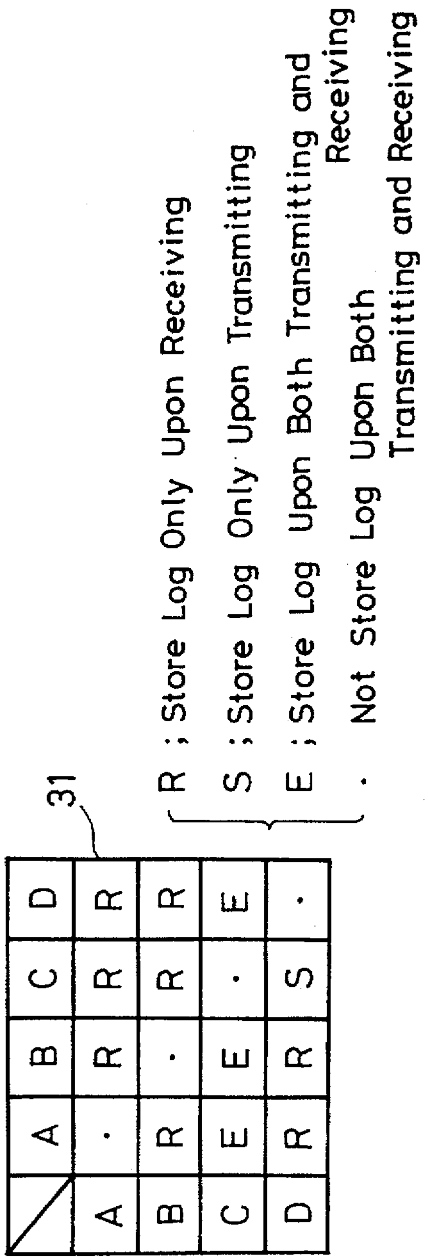
FIG. 5A is a schematic diagram illustrating a mask table.

FIG. 5A shows the structure of an example of a mask table 31. Referring to FIG. 5A, the mask table 31 defines information as to the storage or non-storage of the socket communication log at every pair among four processes A, B, C and D. In FIG. 5A, symbol "R" represents storing the socket communication log only upon receiving, symbol "S" represents storing the socket communication log only upon transmitting, symbol "E" representing storing the socket communication log upon both transmitting and receiving, and a symbol "•" represents not storing the socket communication log upon either transmitting or receiving. Different two bit data, that is 0 to 3 may be allocated to the symbols R, S, E and "•".

Figure 5B:
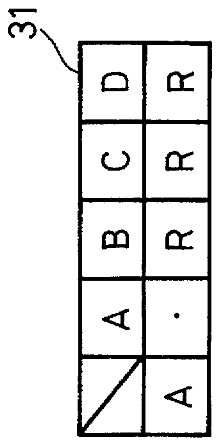
FIG. 5B is a schematic diagram illustrating a part of the mask table shown in FIG. 5A.

In the mask table 31 shown in FIG. 5A, the information as to the storage or non-storage of the socket communication log for process A, for example, is obtained by referring to a row of the process A as shown in FIG. 5B. When the data is transmitted from the process A (source) to the process B (destination), for example, the socket communication log is not stored by the process A. In contrast, when the data is transmitted from the process B (source) to the process A (destination), the communication log is stored by the process A.

Figure 6:
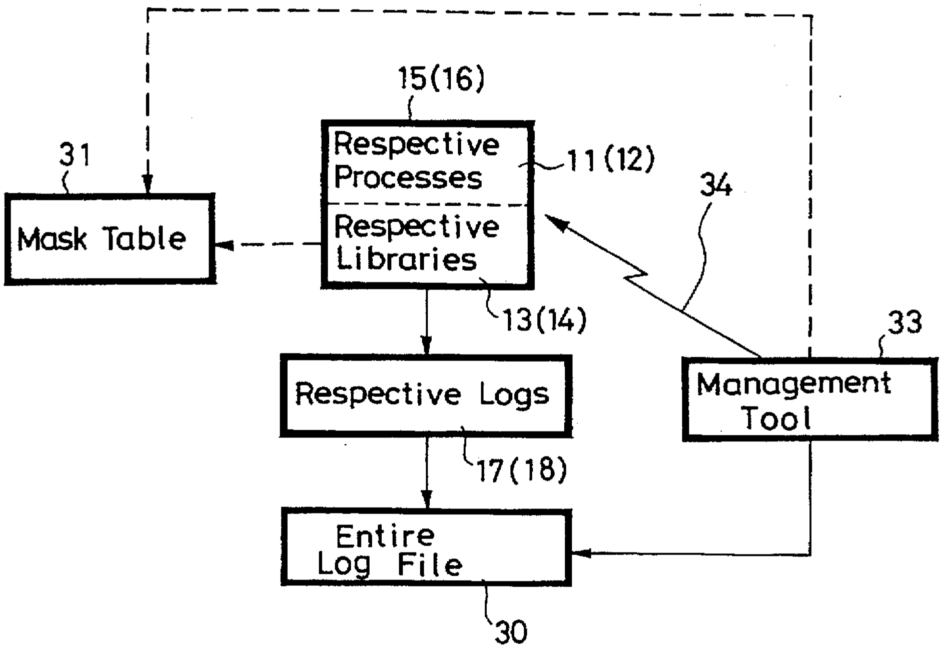
FIG. 6 is a block diagram illustrating an apparatus for storing a socket communication log according to a third embodiment of the present invention.

FIG. 6 shows an arrangement of the socket communication log storing apparatus according to the third embodiment in which the mask table 31 of FIG. 5A is provided. Referring to FIG. 6, each of the process modules 15 and 16 (the process module shown represents both process modules 15 and 16) accesses the mask table 31 upon an initializing process and then reads the information of the mask table 31 on a row relating to itself to thereby store the read information in its memory. As described above, the mask table 31 defines information representing whether to store or not store a socket communication log relating to each of the process modules 15 and 16. In this case, the content of the socket communication log 21 differs from that of the socket communication log 22 merely for the sake of convenience. A management tool 33 is connected to each of the communication use libraries 13 and 14 of the process modules 15 and 16. The management tool 33 supplies a re-reading information from signal (SIGUSR1) 34 for rereading the mask table 31 to the process modules 15 and 16.

An initializing routine of each of the communication use libraries 13 and 14 may be arranged to include a process for storing the signal 34. In this case, when each of the process modules 15 and 16 stores the signal 34, it can reread the information of the mask table 31 relating thereto. Thus, each of the process modules can be set according to whether its own socket communication log is to be stored in the associated log file. Further, the store and non-store information of the mask table 31 can be rewritten at any time by the management tool 33.

Thus, the logging states (store and non-store information) stored in the memory of the process module can be changed in the following procedure:

(1) rewrite data from the mask table 31 by the management tool 33;
(2) supply the signal 34 to all the process modules; and
(3) store the signal 34 with each of the process modules and re-read the information from mask table 31 in response to the signal serving as a trigger signal.

In the embodiment of FIG. 6, so-called "age management" of the log file can be performed in a manner such that the entire log file 30 is subjected to a polling process periodically by the management tool 33. Thereafter, a name of the log file is changed when a volume of the entire log file reached a given value.

Figure 7:
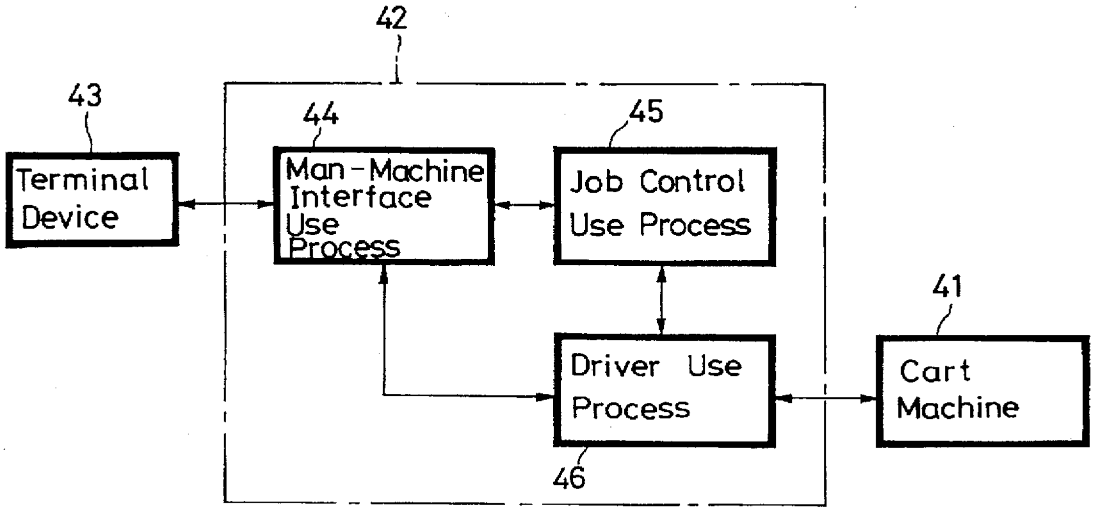
FIG. 7 is a block diagram illustrating an example of cart machine control apparatuses.

FIG. 7 shows an arrangement of the control of a cart machine apparatus 41. The cart machine 41 includes a plurality of cassettes in which CMs are stored and a plurality of reproducing apparatuses. In the cart machine 41, the cassettes are sequentially reproduced by the reproducing apparatus in accordance with a broadcast program schedule table to thereby broadcast spot CMs.

The cart machine 41 is connected to a control use computer 42, which in turn is connected to a terminal device 43 having a display and a key board or the like. The control use computer 42 for the cart machine 41 normally has more than 30 processes, but the computer 42 exemplary shown in FIG. 7 has only three processes 44, 45 and 46 merely to simplify the explanation thereof.

The process 44 is a user-machine interface use process for converting data inputted from the terminal device 43 through key operation into data which can be dealt by the control use computer 42 and also for performing the reverse conversion. The process 45 is a job control use process for storing the data and controlling control timings. The process 46 is a driver use process serving an interface for converting commands for the interface system of the cart machine 41.

Figure 8:
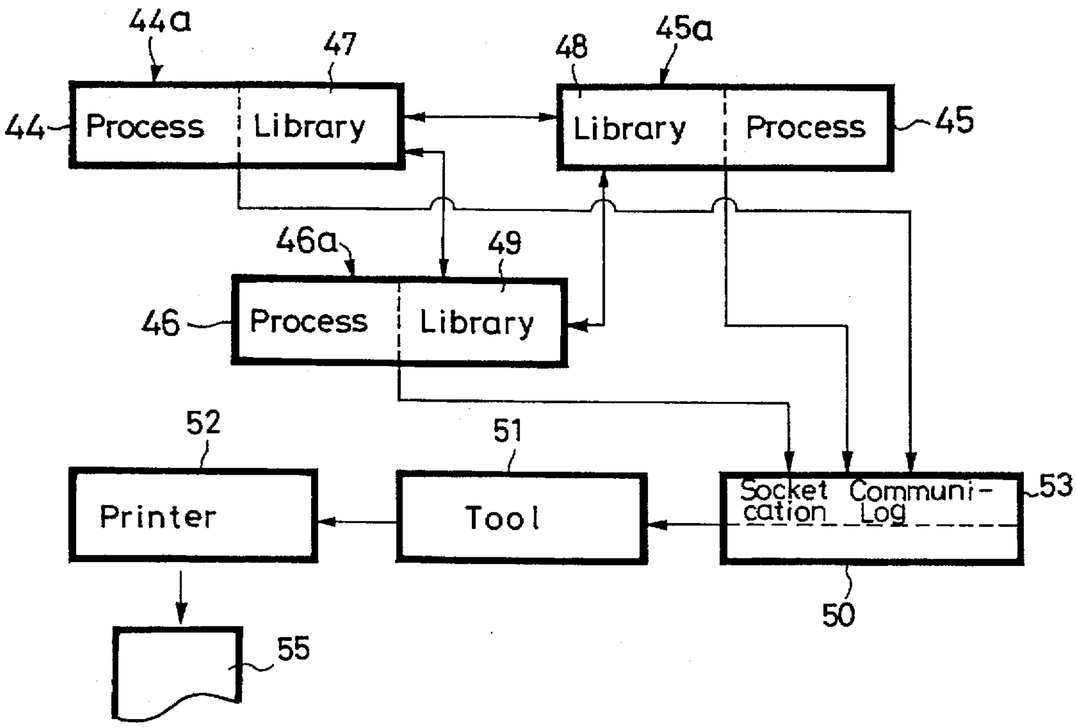
FIG. 8 is block diagram illustrating an apparatus for storing up a socket communication log according to a fourth embodiment of the present invention.

FIG. 8 shows an arrangement of a socket communication log storing apparatus according to a fourth embodiment. Referring to FIG. 8, the processes 44, 45 and 46 are linked respectively to communication use libraries 47, 48 and 49, thereby constituting respective process modules **44*a*, 45*a* and 46*a*. Each of the process modules 44*a*, 45*a* and 46*a* is connected to an entire log file 50 through a symbolic link. In FIG. 8, the log files 17 etc. arranged between the entire log file and the process modules shown in FIG. 4** are omitted merely to simplify the drawing.

An output of the entire log file 50 is connected to an input side of a tool 51 which serves as a conversion program for converting data into characters or the like which are easily understood by a person. The output of the tool 51 is connected to an output device, e.g., a printer 52 which issues a hard copy 55. A monitoring display may be employed instead of the printer 52 as the output device. In the apparatus shown in FIG. 8, when a socket communication is performed between the process modules **44*a* and 45*a*, or 44*a* and 46*a*, or 45*a* and 46*a*, the socket communication log 53 is stored in the entire log file 50** in order of communication.

Figure 9:
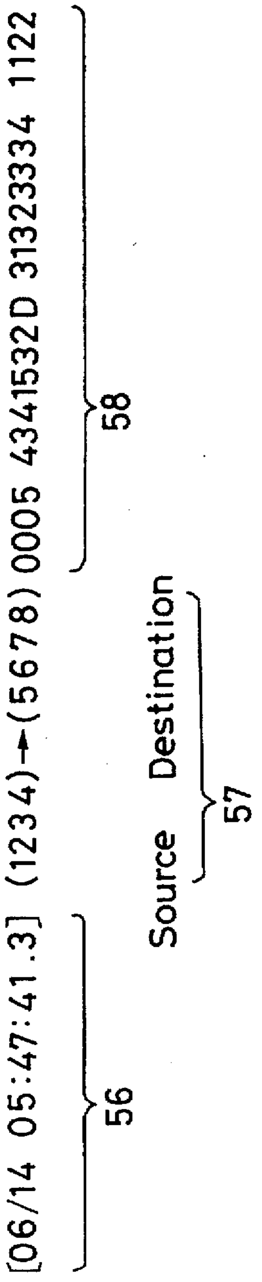
FIG. 9 is a schematic diagram illustrating an example of a socket communication log used in FIG. 8.

FIG. 9 shows an example of the socket communication log 53. The socket communication log 53 has, as described above, time information 56 of the communication, which is a time stamp representing day and time when the transmitting/receiving functions are called as well as transmitting/receiving process ID numbers 57 (source and destination ID numbers), and a communication message 58 or the like.

Figure 10:
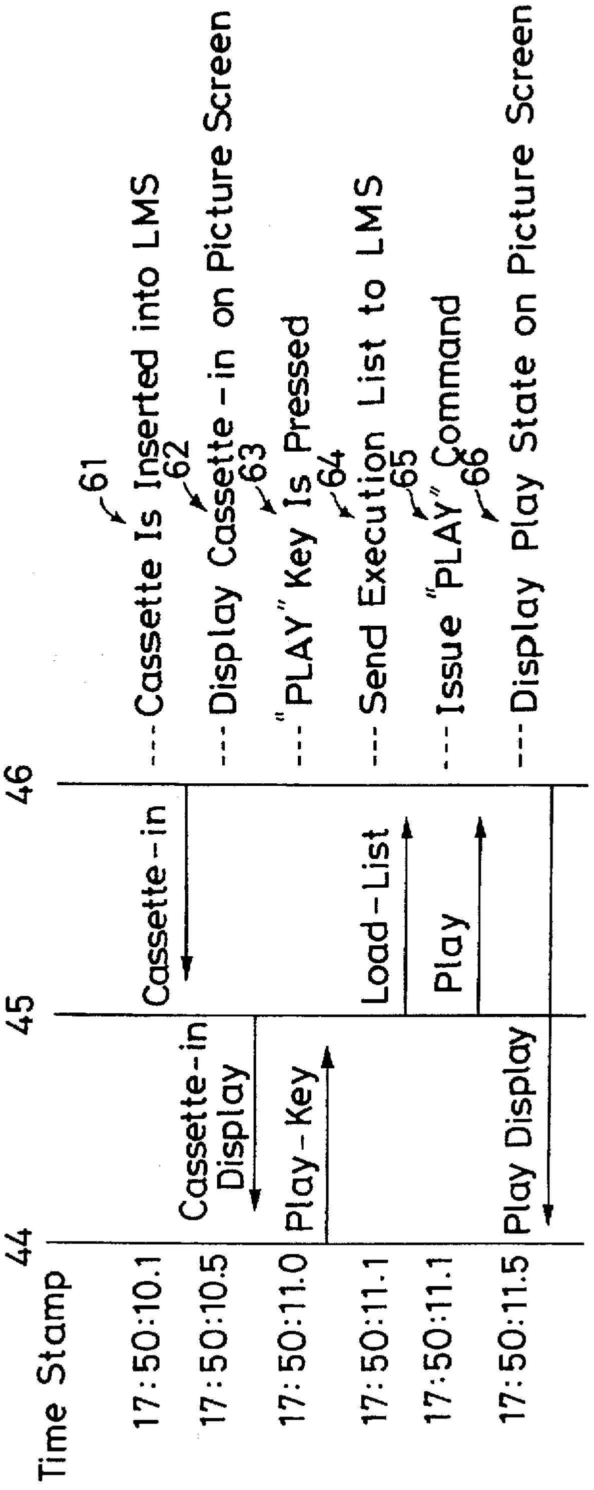
FIG. 10 is a schematic diagram illustrating a concrete content of the socket communication log shown in FIG. 9.

It is difficult for a person to understand the content of the socket communication log 53 from the data of FIG. 9. Thus, the content of the socket communication log 53 is converted by the tool 51 into characters easily understood by a person and then applied to the printer 52, which in turn issues the hard copy 55 on which the converted characters are recorded. A monitor display may be connected to the tool 51 so that the content same as that recorded on the hard copy 55 is displayed thereon. FIG. 10 shows a concrete content of the converted socket communication log shown in FIG. 9 and recorded on a hard copy 55. In FIG. 10, six socket communication logs 61 to 66 are exemplary shown in the communication order downwardly. The concrete contents of these socket communication logs 61 to 66 will be explained with reference to FIG. 10.

Referring to FIG. 10, the socket communication log 61 represents that a cassette has been inserted into the cart machine. In FIG. 10, directions of arrows shown between the respective process modules represent directions of the socket communications. Thus, it will be clear that in the socket communication log 61, the communication data representing "cassette-in" is transmitted to the job control use process 45 from the driver use process 46.

The socket communication log 62 represents that the display of the terminal device 43 displays that the cassette in the cart machine 41 has been inserted in the reproducing device.

In the example shown, the socket communication log 63 represents that a "PLAY key" on the terminal device 43 is pressed. The socket communication log 64 represents that a reproduction execution order list of the cassettes has been sent to the cart machine 41. The reproduction execution order list is normally a spot commercial sending list which is prepared in advance on the basis of the broadcast program schedule list. The socket communication log 65 represents that a "PLAY" command has been issued on the basis of the reproduction execution order list. The socket communication log 66 represents that the content played by the cart machine 41 is displayed on the terminal device 43.

As described above, according to each of the embodiments shown in FIGS. 2D, 4 and 8, since each of the process modules is provided with the communication use library, the process modules can store the socket communication logs in parallel. Thus, the present invention is advantageous in that the communication log can be stored without substantially degrading the processing speed of the apparatus when compared with the apparatus in which the communication log is not stored.

According to the embodiment of FIG. 6, if the signal is applied to the process module as a trigger signal after changing the contents of the mask table shown in FIG. 5A, the process module re-reads the mask table in response to the signal to thereby freely change the store and non-store information of the socket communication log even in the running state of the program without changing the connection of the stream socket.

Further since both the process modules at the source and destination sides can store the socket communication logs, the present invention is advantageous in that even if the socket communication log fails during execution, the socket communication log can be stored at the process module of the source side.

Furthermore, since both the process modules at the source and destination sides can store the socket communication logs, the socket communication log can be fetched and stored without interfering the respective socket communications. Thus, the entire communications can be ascertained and debugging of the program can be performed easily.

As set out above, according to the socket communication log storing apparatus of the present invention, since each of the process modules is in advance linked to the communication use library and the socket communication log storing unit is connected to the process modules, the socket communication log can be stored in the socket communication log storing unit when the socket communication is performed between the process modules. Further, since the process modules can store the socket communication logs in parallel, the present invention is advantageous in that the communication log can be stored without substantially degrading the processing speed of the apparatus when compared with the apparatus in which the communication log is not stored.

Furthermore, since each of the process modules is linked to the communication use library, the present invention is advantageous in that, even if one process module fails, the communication can be continued between other process modules to which the stream socket is connected from the failure process module. Moreover, since each process can be programmed without taking into consideration of the intermediate process, the construction of the software can be relatively simplified.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An apparatus for storing a socket communication log of communications between a plurality of processes in a multitask support system, comprising:
   - a plurality of communication use libraries connected to a corresponding number of said plurality of processes, each of said communication use libraries including a communication use library function for performing a socket communication between said plurality of processes; and
   - means for storing information describing said socket communication in a log, wherein said information is stored in a storing unit each time a socket communication is performed with said library function between plurality of processes.

2. The apparatus according to claim 1, wherein said information is stored in a single log file according to the order of communication of said information.

3. The apparatus according to claim 2, wherein said communication use libraries are directly connected to said single log file.

4. The apparatus according to claim 1, wherein said information includes data which identifies a time at which a socket communication is performed.

5. The apparatus according to claim 1, wherein said information includes data which identifies both transmitting and receiving process modules, said transmitting processes being process modules that initiate a socket communication and said receiving processes being processes which receive a socket communication from a transmitting process.

6. The apparatus according to claim 1, further comprising a mask table which holds instructions that set a mode of operation for a pair of said plurality of processes, said mode of operation having a store state in which said information can be stored and a non-store state in which said information cannot be stored.

7. The apparatus according to claim 6, further comprising a management tool for providing to said pair of said plurality of processes a read signal which indicates that said mask table should be read.

8. The apparatus according to claim 7, wherein an initializing trigger signal is supplied from each of said plurality of communication use libraries to said plurality of processes, said read signal is stored by each of said processes, and said mask table is read in response to said trigger signal.

* * * * *